United States Patent
Mizutani

(10) Patent No.: US 8,358,918 B2
(45) Date of Patent: Jan. 22, 2013

(54) VIDEO PROCESSING APPARATUS AND VIDEO PROCESSING METHOD

(75) Inventor: Fumitoshi Mizutani, Ome (JP)

(73) Assignee: Kabushiki Kaisha Toshiba (JP)

( * ) Notice: Subject to any disclaimer, the term of this patent is extended or adjusted under 35 U.S.C. 154(b) by 323 days.

(21) Appl. No.: 12/777,828

(22) Filed: May 11, 2010

(65) Prior Publication Data

US 2010/0329632 A1  Dec. 30, 2010

(30) Foreign Application Priority Data

Jun. 24, 2009 (JP) ................... 2009-150043

(51) Int. Cl.
- H04N 5/917 (2006.01)
- H04N 9/80 (2006.01)
- H04N 5/93 (2006.01)

(52) U.S. Cl. .................. 386/356; 386/239; 386/353

(58) Field of Classification Search .................. None
See application file for complete search history.

(56) References Cited

U.S. PATENT DOCUMENTS

| | | | |
|---|---|---|---|
| 8,194,997 B2 | 6/2012 | Segall et al. | |
| 2008/0101478 A1 | 5/2008 | Kusunoki | |
| 2009/0015715 A1* | 1/2009 | Yang ............................ | 348/552 |
| 2009/0251598 A1* | 10/2009 | Yamauchi et al. ............ | 348/448 |

FOREIGN PATENT DOCUMENTS

| | | |
|---|---|---|
| JP | 11-355728 | 12/1999 |
| JP | 2005-510984 | 4/2005 |
| JP | 2005-123907 | 5/2005 |
| JP | 2007-257641 | 10/2007 |
| JP | 2008-011071 | 1/2008 |
| JP | 2008-118221 | 5/2008 |
| WO | WO 03/047271 | 6/2003 |
| WO | WO 2008/053557 | 5/2008 |
| WO | WO 2009/003885 | 1/2009 |

OTHER PUBLICATIONS

Information Sheet for IDS.
Japanese Office Action for Corresponding Japanese Application No. 2011-066570, mailed May 22, 2012 in 5 pages.
Japanese Office Action for Corresponding Japanese Application No. 2009-150043, mailed Jan. 25, 2011 in 8 pages.
Kadono, et al., "Revised edition H. 264/AVC Kyokasho", Impress R&D, Jan. 1, 2006, pp. 96-98, [2] Type of NAL Unit, Figs. 4 to 9, Associating Parameter Set with Slice.

* cited by examiner

*Primary Examiner* — William C Vaughn, Jr.
*Assistant Examiner* — Heather Jones
(74) *Attorney, Agent, or Firm* — Knobbe, Martens, Olson & Bear LLP

(57) ABSTRACT

According to one embodiment, a video processing apparatus includes a decoding module, a detection module, a frame rate calculation module, and a display timing determining module. The decoding module decodes encoded moving image data including processing units each of which includes pictures for a predetermined reproduction time. The detection module detects picture group information of a reproduction target processing unit, the information indicative of the number of pictures and the ratio of progressive frame pictures to interlaced field pictures. The frame rate calculation module calculates a frame rate corresponding to a reproduced processing unit preceding the target unit based on picture group information detected when the preceding unit is decoded, if the target unit includes no timing information indicating display timing of pictures. The display timing determining module determines display timings for the pictures in the target unit based on the frame rate.

6 Claims, 9 Drawing Sheets

VIDEO PROCESSING APPARATUS AND VIDEO PROCESSING METHOD

CROSS-REFERENCE TO RELATED APPLICATIONS

This application is based upon and claims the benefit of priority from Japanese Patent Application No. 2009-150043, filed Jun. 24, 2009, the entire contents of which are incorporated herein by reference.

BACKGROUND

1. Field

One embodiment of the invention relates to a video processing apparatus and a video processing method for reproducing moving image data.

2. Description of the Related Art

In recent years, opportunities to view moving image data reproduced by an electronic apparatus such as a personal computer or a video recorder have been increasing. Examples of moving image data to be reproduced include not only those recorded in DVDs or recorded broadcast program data broadcast via television broadcast signals but also those downloaded from moving image data sharing sites on the Internet. Thus, electronic apparatuses such as personal computers and video recorders need to provide a reproduction function corresponding to moving image data in various formats such as MPEG-2 (H.262|MPEG-2), MPEG-4, and MPEG-4 AVC (H.264|MPEG-4 AVC).

Jpn. Pat. Appln. KOKAI Publication No. 11-355728 discloses an audio/video synchronous reproduction method of controlling synchronization between audio and video without the use of a frame rate described in video data. The audio/video synchronous reproduction method calculates the time difference between the latest time stamp and the preceding time stamp and the number of frames between the time stamps using frames, each of which are added time stamps, in video data. The audio/video synchronous reproduction method then calculates the frame rate using the time difference and the number of frames.

It may not be essential to add information on reproduction timings to moving image data for each processing target unit such as GOP. For example, moving image data in the MPEG-4 AVC (H. 264|MPEG-4 AVC) format allows the use of even GOP not including information on reproduction timings. Thus, for example, if moving image data such as a live stream starts to be reproduced from the middle of the stream, the moving image data may not be smoothly reproduced due to unknown picture display timings.

Furthermore, for example, moving image data distributed on the Internet may not exactly conform to the standards. Hence, such moving image data may include moving image data without information on reproduction timings. Such moving image data is also difficult to reproduce smoothly because the reproduction timing for the data is unknown.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a video processing apparatus comprising: a decoding module configured to decode encoded moving image data comprising processing units each of which comprises pictures corresponding to a predetermined reproduction time; a detection module configured to detect picture group information of a reproduction target processing unit in the moving image data, the information indicative of the number of pictures in the reproduction target processing unit and the ratio of progressive frame pictures to interlaced field pictures in the reproduction target processing unit, when the reproduction target processing unit is decoded by the decoding module; a frame rate calculation module configured to calculate a frame rate corresponding to a reproduced processing unit preceding the reproduction target processing unit based on picture group information detected by the detection module when the reproduced preceding processing unit is decoded, if the reproduction target processing unit comprises no timing information indicative of display timing of pictures; and a display timing determining module configured to determine a display timing for each of the pictures in the reproduction target processing unit based on the calculated frame rate.

First, with reference to FIGS. 1 and 2, the configuration of a video processing apparatus according to an embodiment of the present invention will be described. The video processing apparatus according to the present invention is implemented as, for example, a laptop portable personal computer 10 functioning as an information processing apparatus.

The personal computer 10 can reproduce video content data (audio/visual content data) such as broadcast program data, video data input by an external apparatus, or video data distributed through a network such as the Internet.

Figure 1:
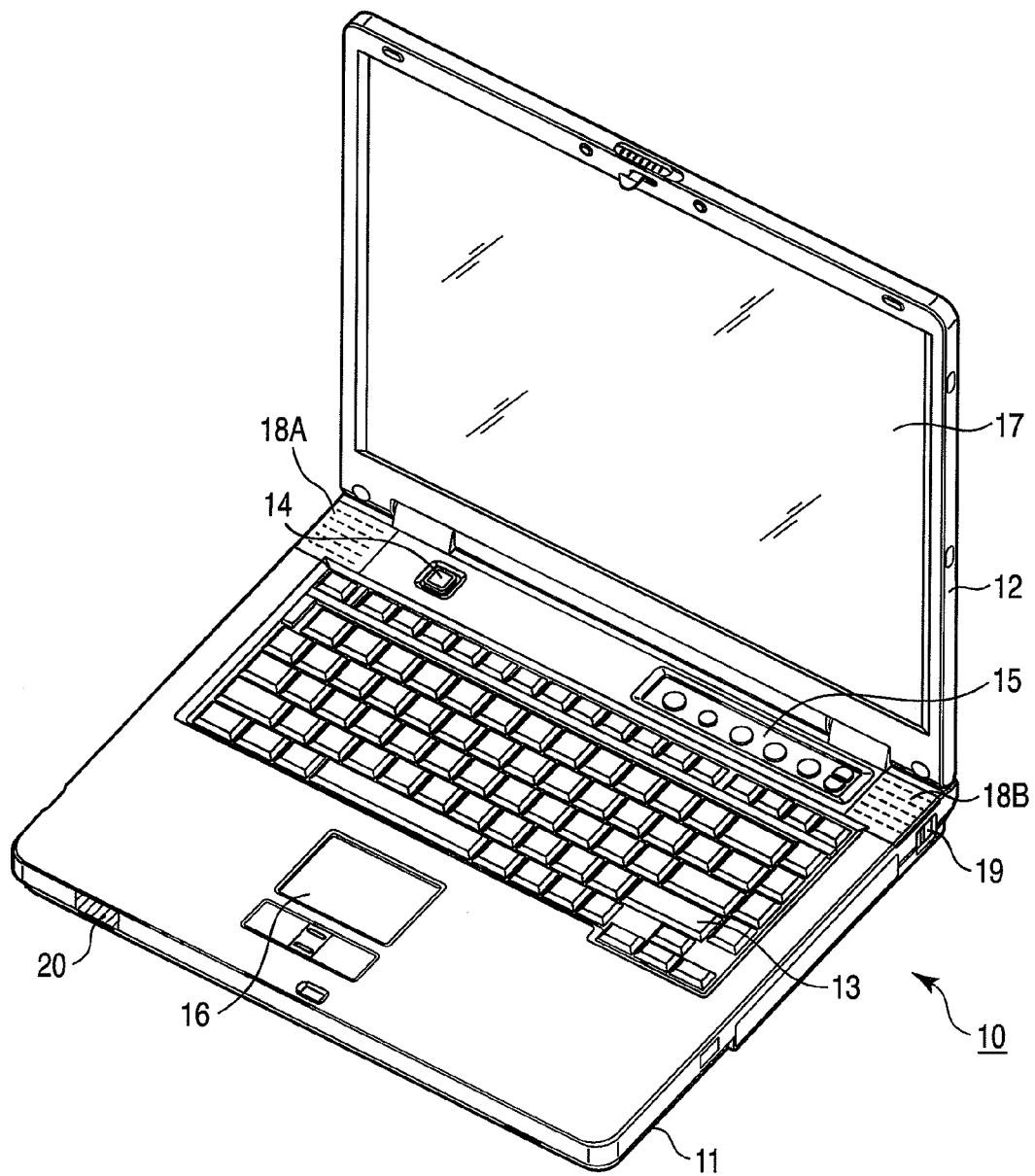
FIG. 1 is an exemplary perspective view showing an example of the appearance of a video processing apparatus according to an embodiment of the present invention.

FIG. 1 is a perspective view showing that a display unit of the computer 10 is open. The personal computer 10 comprises a computer main body 11 and a display unit 12. A display device comprising a thin-film transistor liquid crystal display (TFT-LCD) 17 is built in the display unit 12.

The display unit 12 is attached to the computer main body 11 such that the display unit 12 is rotatable between an open position where the top surface of the computer main body 11 is exposed, and a closed position where the top surface of the computer main body 11 is covered. The computer main body 11 has a thin box-shaped housing. A keyboard 13, a power switch 14 for powering on/off the computer 10, an input operation panel 15, a touch pad 16, and speakers 18A and 18B are disposed on the top surface of the housing of the computer main body 11.

Now, the system configuration of the computer 10 will be described with reference to FIG. 2.

Figure 2:
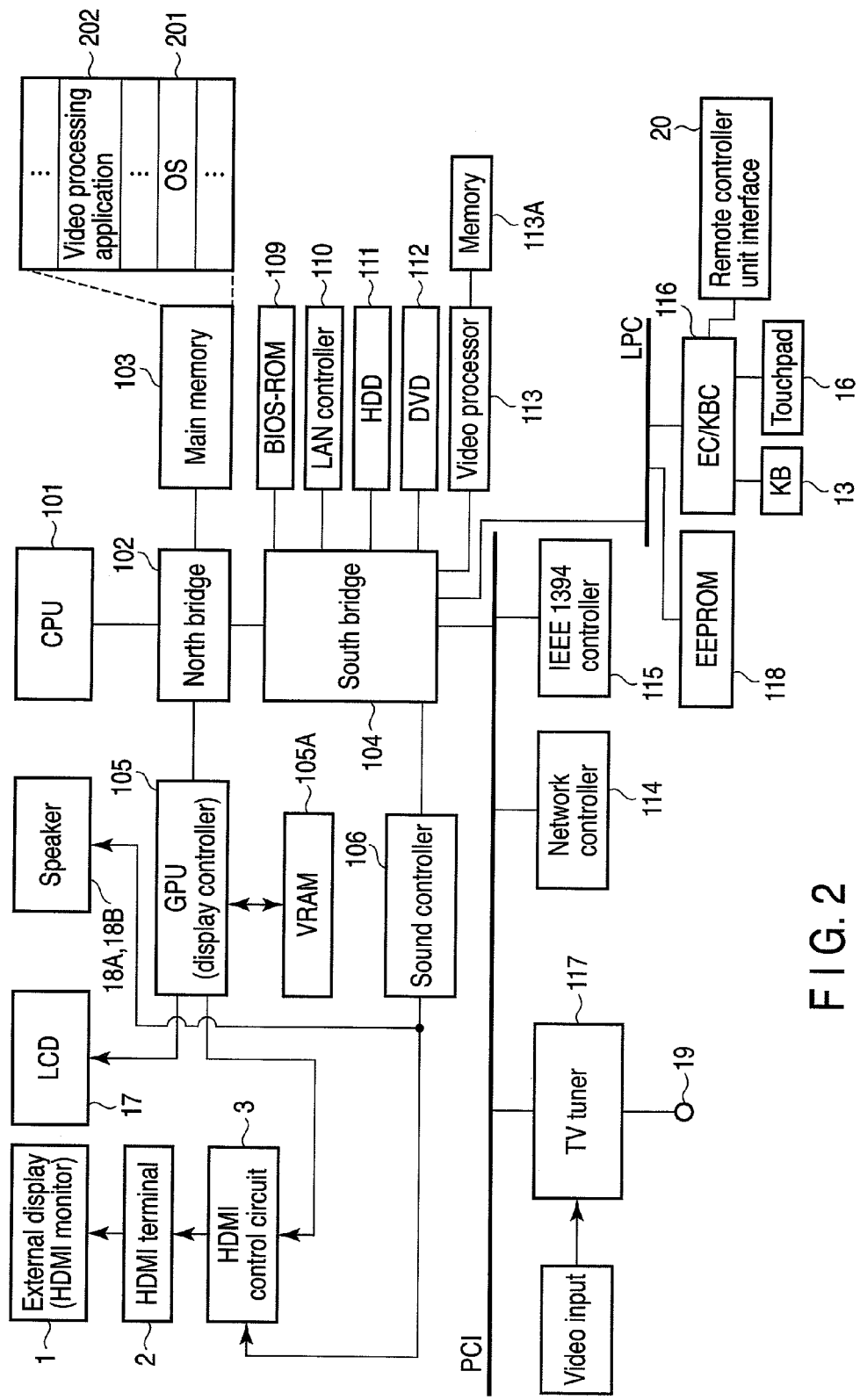
FIG. 2 is an exemplary block diagram showing an example of the configuration of the video processing apparatus according to the embodiment.

As shown in FIG. 2, the computer 10 comprises a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a video processor 113, a memory 113A, a network controller 114, an IEEE 1394 controller 115, an embedded controller/keyboard controller IC (EC/KBC) 116, a TV tuner 117, and an EEPROM 118.

The CPU 101 is a processor for controlling the operation of the computer 10. The CPU 101 executes an operating system (OS) 201 and application programs such as a video processing application program 202, which are loaded from the hard disk drive (HDD) 111 into the main memory 103. The video processing application program 202 is software for reproducing moving image data. The video processing application program 202 can reproduce recorded moving image data received by the TV tuner 117, moving image data recorded on HDD 111, DVD loaded in the DVD drive 112, moving image data distributed by servers on a network and received by the LAN controller 110, or the like. Furthermore, the CPU 101 also executes a Basic Input/Output System (BIOS) stored in BIOS-ROM 109. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of executing communication with the GPU 105 via, e.g. a PCI EXPRESS serial bus.

The GPU 105 is a display controller configured to control the LCD 17 used as a display monitor for the computer 10. Display signals generated by the GPU 105 are transmitted to the LCD 17. Furthermore, the GPU 105 can transmit digital video signals to an external display apparatus 1 via an HDMI control circuit 3 and an HDMI terminal 2.

The HDMI terminal 2 is an external display connection terminal. The HDMI terminal 2 can transmit uncompressed digital video signals and digital audio signals to the external display apparatus 1 such as a television through one cable. The HDMI control circuit 3 is an interface called an HDMI monitor and configured to transmit digital video signals to the external display apparatus 1 via the HDMI terminal 2.

The south bridge 104 controls the devices on a Low Pin Count (LPC) bus and the devices on a Peripheral Component Interconnect (PCI) bus. Furthermore, the south bridge 104 includes an Integrated Drive Electronics (IDE) controller for controlling the hard disk drive (HDD) 111 and the DVD drive 112. Moreover, the south bridge 104 provides the function of communicating with the sound controller 106.

Furthermore, the video processor 113 is connected to the south bridge 104 via a PCI EXPRESS-compliant serial bus.

The sound controller 106 is a sound source device to output reproduction target audio data to the speakers 18A and 18B or the HDMI control circuit 3.

The LAN controller 110 is a communication device to perform communication in conformity with, for example, the IEEE 802.3 standards. The network controller 114 is a wireless communication device configured to perform wireless communication in conformity with, for example, the IEEE 802.11 standards. The IEEE 1394 controller 115 communicates with an external apparatus via an IEEE 1394-compliant serial bus.

The embedded controller/keyboard controller IC (EC/KBC) 116 is a one-chip microcomputer including an embedded controller for power management, and a keyboard controller for controlling the keyboard (KB) 13 and the touch pad 16; the embedded controller and the keyboard controller are integrated. The embedded controller/keyboard controller IC (EC/KBC) 116 provides the function of powering on and off the computer 10 in accordance with the user's operation of the power button 14. Moreover, the embedded controller/keyboard controller IC (EC/KBC) 116 provides the function of communicating with a remote unite interface 20.

The TV tuner 117 is a reception apparatus configured to receive broadcast program data broadcast by television (TV) broadcast signals. The TV tuner 117 is connected to an antenna terminal 19. The TV tuner 117 is implemented as, for example, a digital TV tuner that can receive digital broadcast program data such as terrestrial digital TV broadcasting. Furthermore, the TV tuner 117 provides the function of capturing video data input by an external apparatus.

Figure 3:
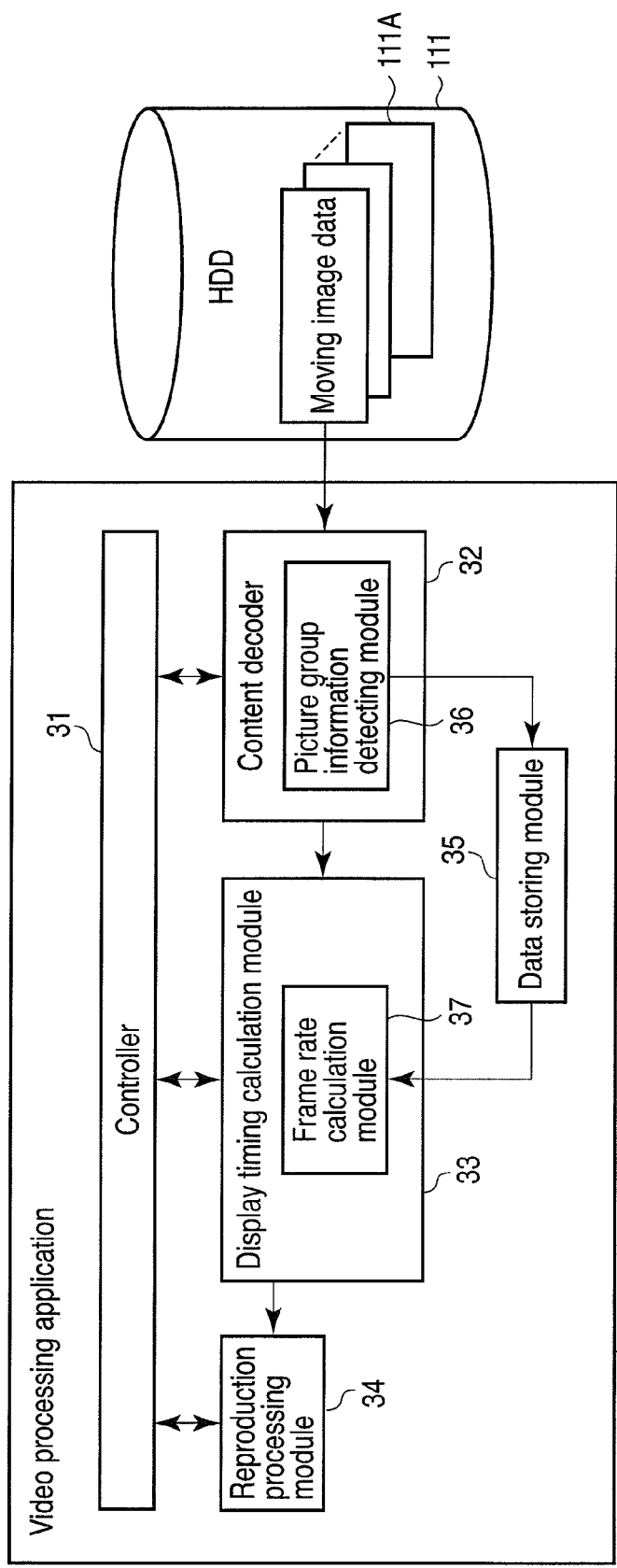
FIG. 3 is an exemplary block diagram showing an example of the configuration of the functions of a video processing application used in the video processing apparatus according to the embodiment.

FIG. 3 is a block diagram showing the configuration of the video processing application program. As described above, the video processing application program 202 can reproduce recorded moving image data received by the TV tuner 117, moving image data recorded on HDD 111, DVD loaded in the DVD drive 112, or the like, and moving image data distributed by servers on a network. An example in which moving image data 111A stored on HDD 111 is reproduced will be described.

The video processing application 202 decodes and reproduces the encoded (compression encoded) moving image data 111A. The moving image data 111A comprises a moving image stream encoded in accordance with a coding scheme, for example, H.264|MPEG-4 AVC (hereinafter referred to as H.264/AVC), MPEG-2, or MPEG-4. The moving image data 111A comprises a plurality of GOPs. Each GOP is a processing unit including a plurality of pictures corresponding to a predetermined reproduction time. The video processing application program 202 comprises a controller 31, a content decoding module 32, a display timing calculation module 33, a reproduction processing module 34, a data storing module 35, a picture group information detecting module 36, and a frame rate calculation module 37.

The controller 31 controls the modules in the video processing application program 202. The content decoding module 32 reads the compression encoded moving image data 111A stored on HDD 111, and then decodes the read moving image data 111A. The moving image data 111A can be decoded, for example, in GOP unit.

Figure 4:
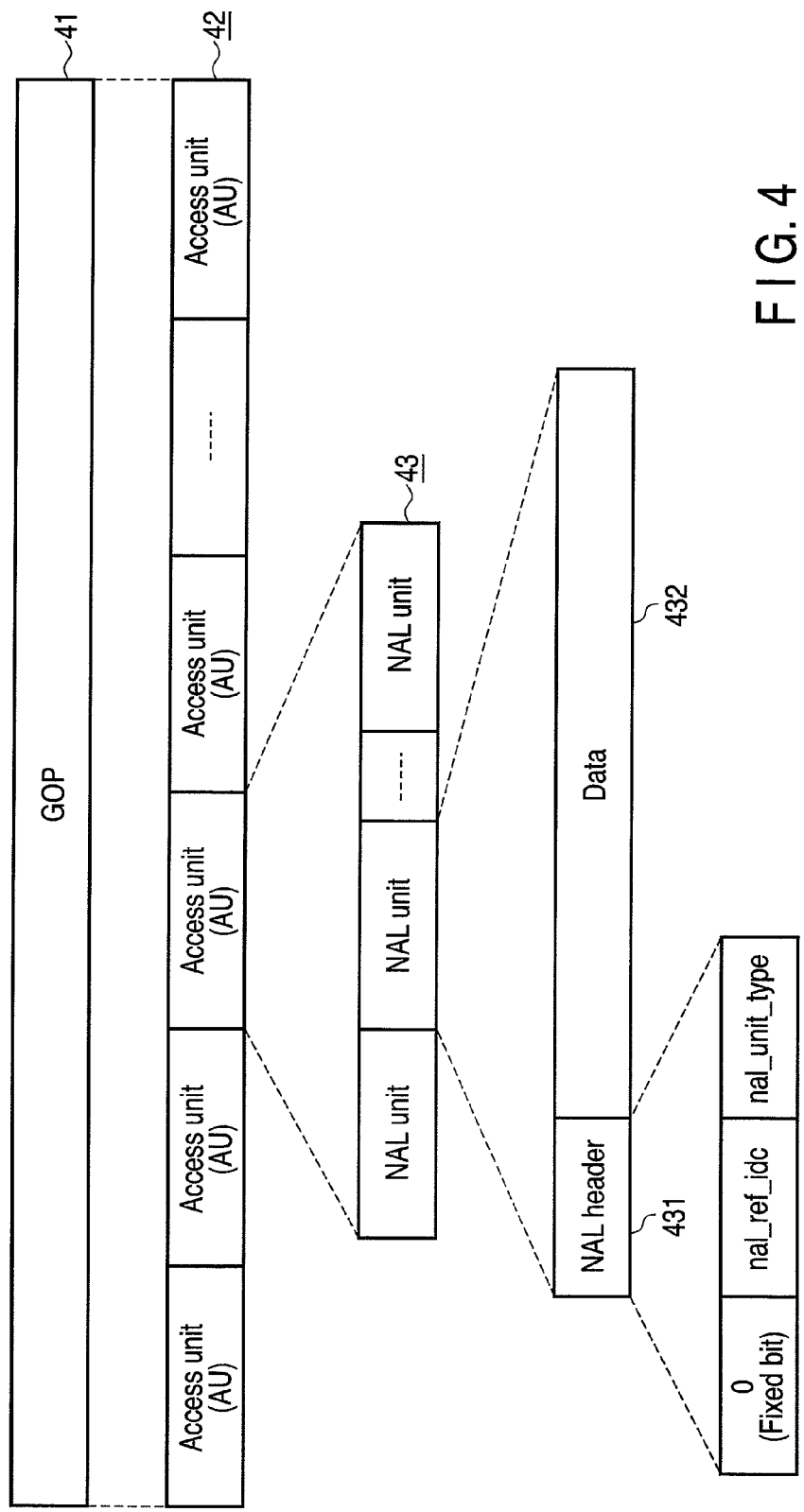
FIG. 4 is an exemplary diagram showing an example of the configuration of moving image data input to the video processing apparatus according to the embodiment.

FIG. 4 is a diagram showing an example of the configuration of the moving image data 111A. The moving image data 111A comprises units called groups of pictures (GOPs) 41. The GOP 41 includes data on a plurality of pictures reproduced during a predetermined period (for example, 0.5 seconds). The GOP 41 comprises a plurality of access units (AUs) 42.

The access units 42 allow the information in a bit stream of encoded moving image data to be accessed for each picture. Each of the access units 42 comprises a plurality of NAL units 43.

Each of the NAL units 43 includes a NAL header 431 and compressed moving image data 432. The NAL header 431 includes nal_ref_idc that is information indicating whether the NAL unit is a reference picture and nal_unit_type that is an identifier indicative of the type of NAL unit.

The NAL units 43 are classified into VCL NAL units and non-VCL NAL units. The VCL NAL unit is a NAL unit which includes data on pictures (slices) that are image data. The non-VCL NAL unit is a NAL unit which includes metadata such as a parameter set such as a sequence parameter set (SPS) or a picture parameter set (PPS), supplemental enhancement information (SEI), and AU delimiters.

Figure 5:
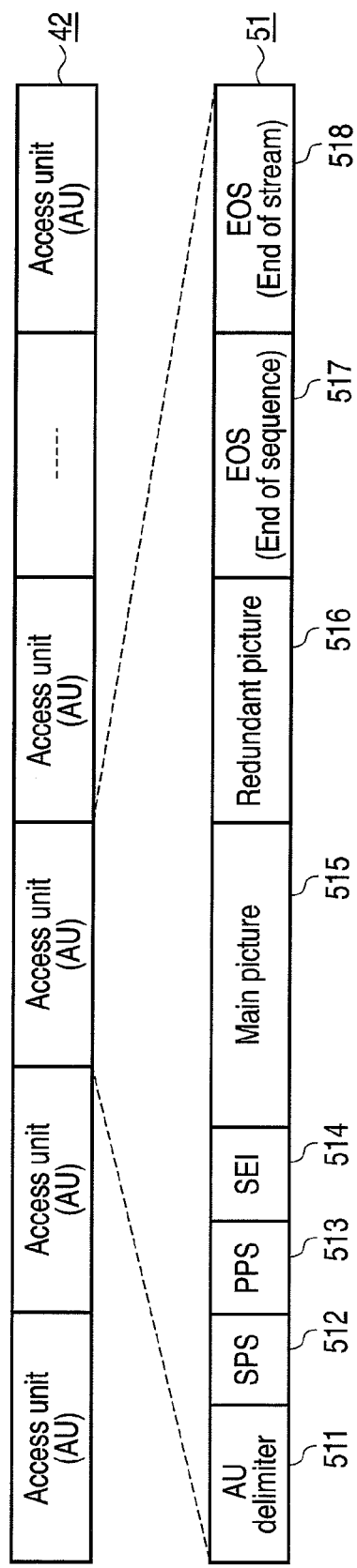
FIG. 5 is an exemplary diagram showing an example of the specific configuration of moving image data.

FIG. 5 is a diagram showing an example of NAL units 51 that may be included in the access unit 42.

The access unit 42 comprises an AU delimiter 512, an SPS 512, a PPS 513, an SEI 514, a main picture 515, a redundant picture 516, an end of sequence (EOS) 517, and an end of stream (EOS) 518.

The AU delimiter 511 is a start code indicative of the head of the access unit. The SPS 512 is a header including information on coding of the entire sequence. However, the SPS 512 may not be added to the head of the sequence. The SPS 512 fed by the time when processing the head of the sequence is used as header information. The PPS 513 is header information indicative of the coding mode of the entire picture (for example, an entropy coding mode, initial quantization parameters for a picture, or the like). However, the PPS 513 may not be added to all the pictures. If the access unit 42 does not include the PPS 513, the PPS 513 fed by the time when processing the head of the picture is used as header information. The SEI 514 is indicative of additional information that is not essential for decoding of the sequence. For example, picture timing information, information used for random accesses, or user defined information is described in the SEI 514. The main picture 515 includes information on normal pictures. The pictures in the sequence can be decoded by decoding the information in the main picture 515. The redundant picture 516 includes information on a picture utilized if a transmission error or the like occurs. Thus, the redundant picture 516 is utilized, for example, when part of the data in the main picture 515 is lost by a transmission error or the like. The EOS 517 is a code indicative of the terminal of a sequence. The EOS 518 is a code indicative of the terminal of a stream.

The content decoding module 32 decodes the moving image data 111A. The content decoding module 32 analyzes the structure of the GOP 41, the access unit 42, the NAL unit 43, and the like as described above. The content decoding module 32 outputs the analysis result to the display timing calculation module 33. Furthermore, when the reproduction target GOP is decoded, the picture group information detecting module 36 in the content decoding module 32 detects picture group information on the picture group in the reproduction target GOP. The picture group information is indicative of the number of pictures in the reproduction target GOP, the ratio of progressive frame pictures to interlaced field pictures in the reproduction target processing unit, and the like. The picture group information detecting module 36 outputs the detected picture group information to the data storing module 35.

The data storing module 35 stores the input picture group information to the main memory 103 or the like. The picture group information is stored every time the reproduction target GOP is decoded. Thus, if picture group information on the preceding reproduction target GOP is stored, the data storing module 35 updates the picture group information with picture group information on a new reproduction target GOP.

The display timing calculation module 33 determines a display timing for each of the pictures in the reproduction target GOP based on the analysis result from the content decoding module 32. If the access unit 423 is to be reproduced, the display timing calculation module 33 determines timings when the pictures in the main picture 515 are displayed, based on parameters in the SPS 512 and the SEI 514. The display timing is calculated using Picture Timing SEI that is a part of the SEI 514 and Video Usability Information (VUI) that is a part of the SPS 512.

Structure information on the picture or the like is described in the Picture Timing SEI. For example, the information of pic_struct is described in the Picture Timing SEI.

The structure of the pictures is described in the pic_struct. For example, the following is described in the pic_struct: the order in which pictures corresponding to odd-numbered lines and pictures corresponding to even-numbered lines are interlaced, and the number of times that each picture is displayed.

A parameter relating to video display information is described in the VUI. For example, values for time_scale and num_units_in_tick are set in the VUI. The time_scale is indicative of the number of time units in one second. For example, for a 27 MHz clock, the value 27,000 is set in the time_scale.

Furthermore, the num_units_in_tick is indicative of the number of time units on a clock operating frequency time_scale [Hz]. This value corresponds to one increment in a clock counter (clock tick counter). One clock tick is a minimum time unit that can be expressed in encoded data. For example, if the clock frequency of the video is 30,000/1,001 [Hz], then 30,000 is set in the time_scale, and 1,001 is set in the num_units_in_tick.

The display timing calculation module 33 uses the pic_struct in the Picture Timing SEI, the time_scale and the num_units_in_tick in the VUI, and the like described above to determine a display timing for each of the pictures in the GOP 41 comprising a plurality of access units 42.

However, the only NAL unit essential for the access unit 42 is the main picture 515. The SPS 512, SEI 514, and the like are optional NAL units in the access unit 42 as required. That is, adding information on reproduction timing to each access unit 42 or each GOP 41 for the moving image data 111A is not essential. Furthermore, for example, moving image data distributed on the Internet does not exactly comply with the standards. Thus, information on the reproduction timing may fail to be appropriately added to some access units 42 or GOPs 41. Consequently, if moving image data such as a live stream starts to be reproduced from the middle of the stream or the access unit 42 (GOP 41) includes no NAL unit in which information on the reproduction timing is stored, the display timings for the pictures are unknown. Therefore, smoothly reproducing the pictures is difficult.

Thus, the content decoding module 32 determines whether the decoded reproduction target GOP includes information on the display timing. If the reproduction target GOP includes no information on the display timing, the display timing calculation module 33 utilizes information (picture group information) on the reproduced GOP preceding the processing target GOP to calculate the display timings (the values of the timestamp) for the processing target GOP.

The information on the preceding GOP is stored in the main memory 103 or the like by the data storing module 35. The information on the preceding GOP is the number of pictures in the preceding GOP, the ratio of frame pictures to field pictures in the preceding GOP, and the like as described above. The information on the preceding GOP may further include the reproduction time for the preceding GOP or the number of times that the picture is displayed.

Figure 6:
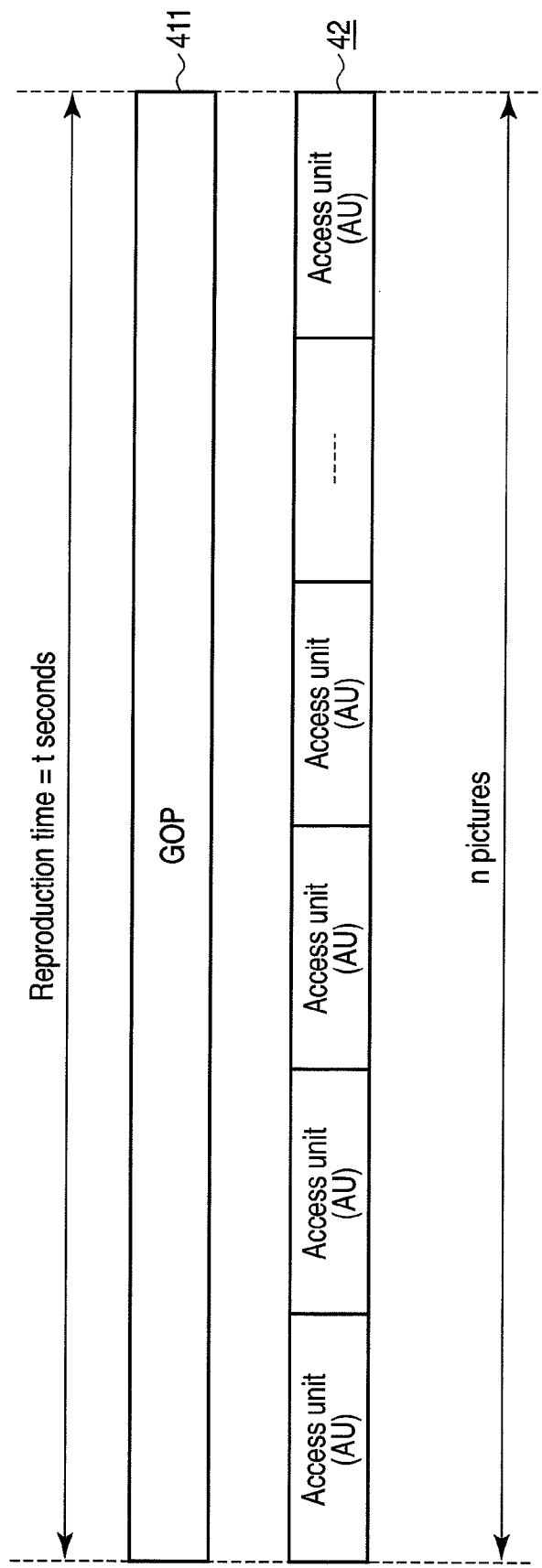
FIG. 6 is an exemplary diagram illustrating a method for calculating display timings for moving image data.

The frame rate calculation module 37 provided in the display timing calculation module 33 calculates, based on the time to reproduce the preceding GOP 411 and the number of frames in the preceding GOP 411, for example, as shown in FIG. 6, the frame rate of the preceding GOP 411, that is, the number of frames reproduced per unit time (frames per second (fps)), as follows:

The number of pictures in the preceding GOP/the reproduction time for the preceding GOP.

As described above, the frame rate calculation module 37 calculates the frame rate using the picture group information (picture group information on the preceding GOP) stored in the main memory 103 or the like by the data storing module 35.

Figure 7:
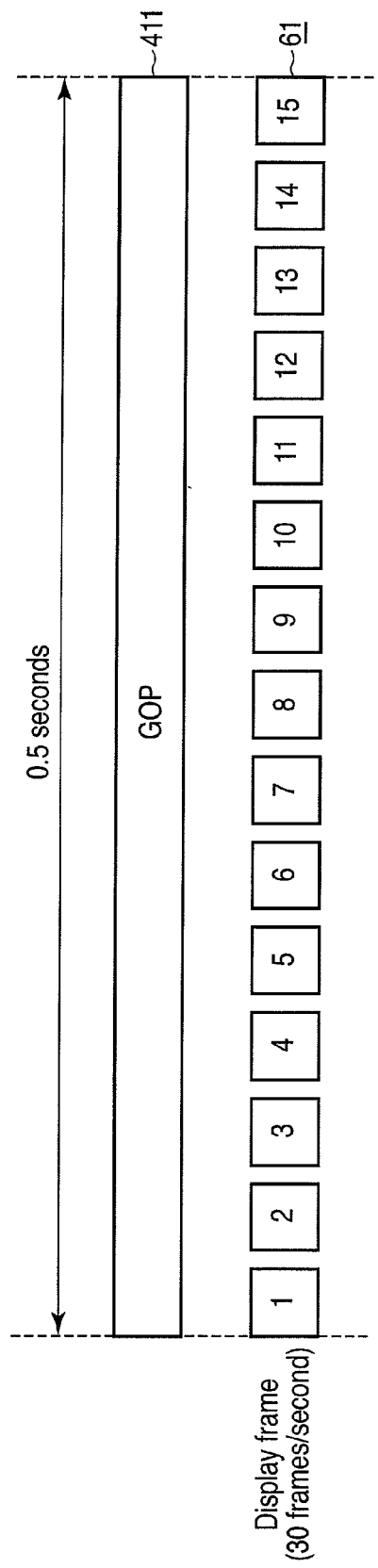
FIG. 7 is an exemplary diagram showing a specific example in which the display timings for moving image data are calculated.

FIG. 7 shows an example in which the display timings are determined based on the time to reproduce the preceding GOP 411 and the number of pictures in the preceding GOP 411. In the example shown in FIG. 7, the reproduction time for the preceding GOP 411 is 0.5 seconds, and the number of pictures 61 in the preceding GOP 411 is 15. All the pictures in the preceding GOP 411 are assumed to be of the progressive type (frame pictures).

In this case, the number of frames reproduced per unit time is 30 fps. Based on the calculated number of frames reproduced per unit time, the display timing calculation module 33 determines the display timings for the pictures in the processing target GOP. If the number of frames reproduced per unit time is 30 fps, the display timing calculation module 33 determines the display timings such that the picture is displayed every 1/30 second.

Figure 8:
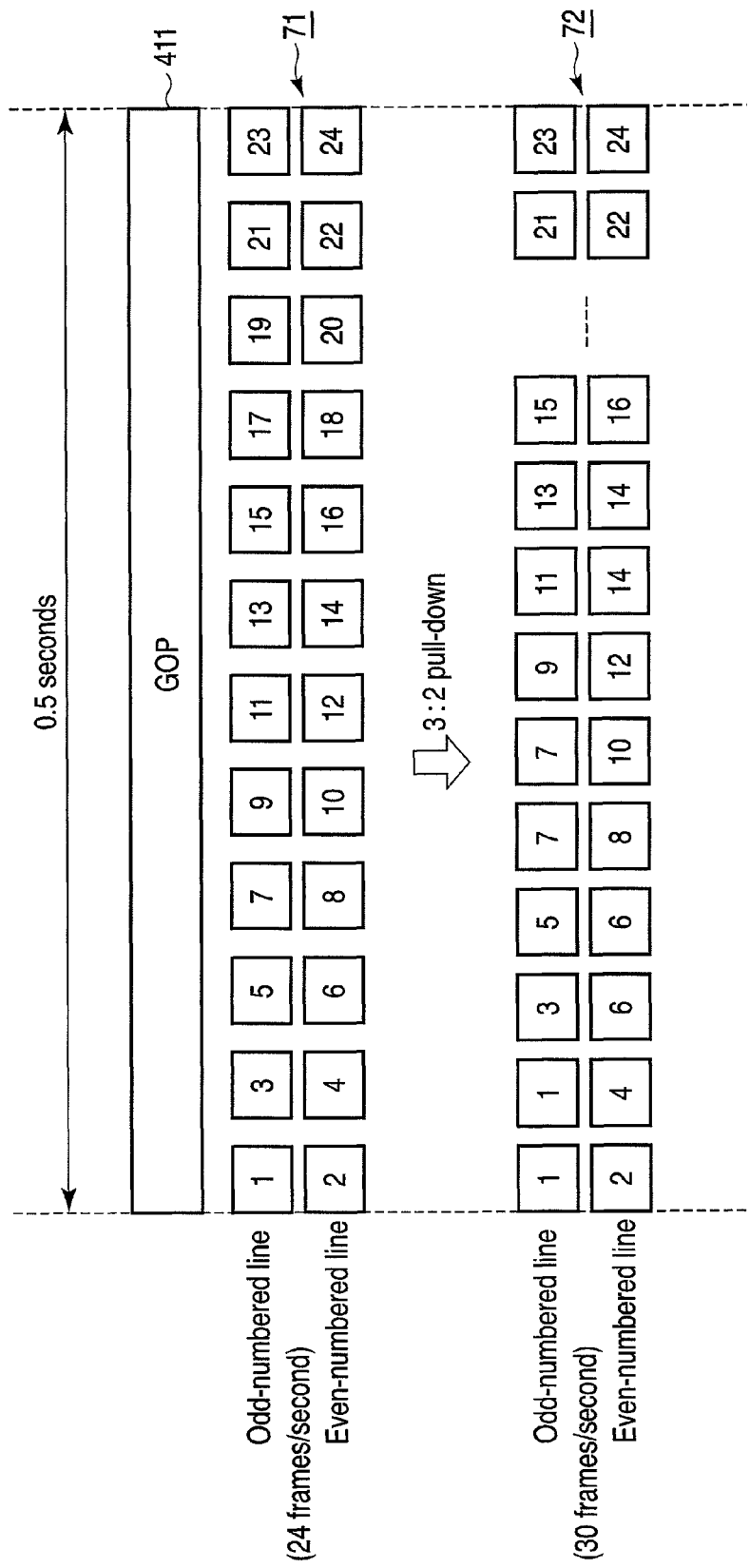
FIG. 8 is an exemplary diagram showing another specific example in which the display timings for moving image data are calculated.

Furthermore, FIG. 8 shows another example in which the display timing calculation module 33 determines the display timings. In the example shown in FIG. 8, the reproduction time for the preceding GOP 411 is 0.5 seconds. The preceding GOP 411 includes 24 interlaced field pictures 71; 12 pictures are used to display odd-numbered lines and the remaining 12 pictures are used to display even-numbered lines. Two pictures, that is, a picture for an odd-numbered line and a picture for an even-numbered line, are used to display one frame. Thus, the 24 interlaced pictures 71 are used to display images in 12 frames are displayed on the LCD 17. Hence, the number of frames reproduced per unit time is 24 fps. If the number of frames reproduced per unit time is 24 fps, the display timing calculation module 33 determines the display timings such that the pictures for the odd-numbered lines and the pictures for the even-numbered lines are alternately and sequentially displayed every 1/24 second.

Furthermore, pictures 72 generated when the pictures 71 in the preceding GOP 411 are displayed in accordance with a 3:2 pull-down scheme are shown in the lower part of FIG. 8. As shown in FIG. 8, some of the pictures are displayed twice to increase the number of frames displayed. Thus, images in 15 frames are displayed on the LCD 17 during a reproduction time of 0.5 seconds. Hence, the number of frames reproduced per unit time is 30 fps. If the number of frames reproduced per unit time is 30 fps, the display timing calculation module 33 determines the display timings such that the pictures for the odd-numbered lines and the pictures for the even-numbered lines are alternately and sequentially displayed every 1/30 second.

The display timing calculation module 33 outputs information on the determined display timings to the reproduction processing module 34.

The reproduction processing module 34 displays the pictures in the processing target GOP on the LCD 17. That is, the reproduction processing module 34 adds timestamp information based on the display timings to the pictures in the processing target GOP. The pictures are displayed on the LCD 17 in accordance with the added timestamp information.

According to the above-described configuration, even when GOP including no added information on the display timing is reproduced, the moving image data 111A can be smoothly reproduced as follows. Information on the GOP 411 assumed to have the same or a similar structure is used to estimate the display timings for the processing target GOP. Then, in accordance with the estimated display timing, the pictures in the processing target GOP are reproduced.

Figure 9:
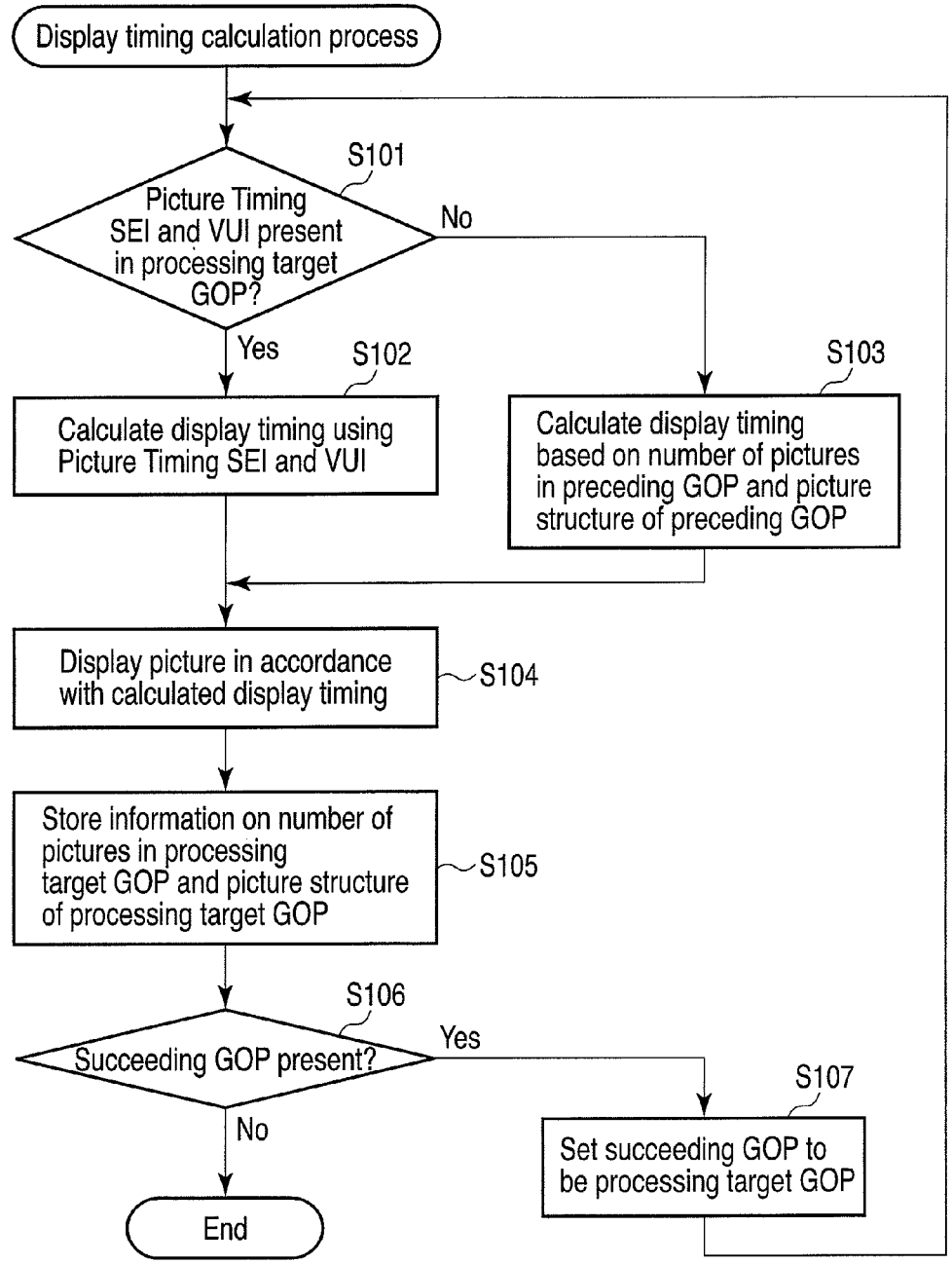
FIG. 9 is an exemplary flowchart showing the procedure of a display timing calculation process executed by the video processing apparatus according to the embodiment.

FIG. 9 is a flowchart showing the procedure of a display timing calculation process executed by the video processing application 202.

First, the video processing application 202 decodes the reproduction target GOP in the moving image data 111A. The video processing application 202 then determines whether the decoded GOP includes information on the display timing such as the picture timing SEI and VUI (block B101). Furthermore, when decoding the reproduction target GOP, the video processing application 202 executes a process of counting the number of pictures in the reproduction target GOP and a process of counting the numbers of frame pictures and field pictures in the reproduction target GOP.

If the reproduction target GOP includes information on the display timing (YES in block B101), the video processing application 202 uses the picture timing SEI, VUI, and the like to calculate the display timings for the pictures in the reproduction target GOP (block B102).

If the reproduction target GOP includes no information on the display timing (NO in block B101), the video processing application 202 calculates the display timings based on information (picture group information) on the reproduced GOP (preceding GOP) 411 preceding the reproduction target GOP (block B103). The video processing application 202 calculates the display timings based on the reproduction time for the preceding GOP 411, the number of pictures in the preceding GOP 411, and the picture structure (ratio of frame pictures to field pictures) of the preceding GOP 411, that are stored in the main memory 103 or the like. Specifically, the video processing application 202 calculates the number of frames per unit time (frame rate) based on the reproduction time for the preceding GOP 411 and the number of frames displayed on the LCD 17 during the reproduction time. The video processing application 202 then determines the timing for displaying each picture taking into account whether each picture is of the progressive type or the interlaced type.

Then, the video processing application 202 displays the pictures in the reproduction target GOP in accordance with the calculated display timings (block B104). That is, the video processing application 202 adds timestamp information corresponding to the display timings, to the pictures in the reproduction target GOP. The pictures in the reproduction target GOP are reproduced in accordance with the timestamp information.

Furthermore, the video processing application 202 stores information on the number of pictures in the reproduction target GOP and the picture structure of the reproduction target GOP, to the main memory 103 or the like as picture group information (block B105).

Then, the video processing application 202 determines whether GOP succeeding the reproduction target GOP is present in the moving image data 111A (block B106).

If the GOP succeeding the reproduction target GOP is present (YES in block B106), the video processing application 202 sets the succeeding GOP to be a new reproduction target GOP (block B107). The video processing application 202 then executes the processing in block B101 and the subsequent blocks.

If the GOP succeeding the reproduction target GOP is not present (NO in block B106), the video processing application 202 determines that the moving image data 111A has been reproduced up to the end of the data, and then terminates the process.

The above-described process allows the moving image data 111A to be smoothly reproduced even if the reproduction target GOP includes no information on the display timing. If the reproduction target GOP includes information on the display timing, the video processing application 202 uses the information to calculate the display timings for the pictures. If the reproduction target GOP includes no information on the display timing, the video processing application 202 uses information on the preceding GOP 411 assumed to have the same or a similar structure to calculate the display timings for the processing target GOP.

If the reproduction target GOP is the leading GOP of the sequence of the moving image data 111A, the pictures in the GOP may be displayed in accordance with predetermined display timings. When the subsequent GOPs are displayed, the pictures in the processing target GOP may be displayed by using the number of pictures in the reproduced preceding GOP, the picture structure of the preceding GOP, and the like to determine the display timings.

As described above, the present embodiment allows moving image data with unknown reproduction timings to be smoothly reproduced. If the reproduction target GOP includes information on the display timing, the display timing calculation module 33 of the video processing application 202 determines the display timings for the pictures in the reproduction target GOP. If the reproduction target GOP includes no information on the display timing, the display timing calculation module 33 of the video processing application 202 determines the display timings for the pictures in the reproduction target GOP based on the number of pictures in the reproduced GOP preceding the reproduction target GOP, the picture structure of the preceding GOP, and the like detected when the preceding GOP is reproduced.

The reproduction target GOP and GOP preceding the reproduction target GOP are assumed to have the same or similar display timings for the pictures. Thus, if the reproduction target GOP includes no information on the display timing, moving image data with unknown reproduction timings can be smoothly reproduced by determining the display timings based on the number of pictures in the preceding GOP 411, the picture structure of the preceding GOP 411, and the like, and displaying the pictures in the reproduction target GOP in accordance with the determined display timings.

Reproduction of the moving image data 111A requires real-time processing. Thus, in the present embodiment, every time the reproduction target GOP is decoded, the number of pictures in the reproduction target GOP, the picture structure of the reproduction target GOP, and the like are detected. Then, if the current reproduction target GOP includes no display timing information, the display timings for the current reproduction target GOP are calculated based on the number of pictures, the picture structure, and the like detected when the GOP preceding the reproduced preceding GOP is decoded. Thus, even when streaming reproduction is performed such that moving image data is received via a network and simultaneously reproduced or moving image data such as a live stream starts to be reproduced from the middle of the stream, the moving image data can be smoothly reproduced in real time.

Furthermore, all of the procedure of the display timing calculation process according to the present embodiment can be carried out by software. Thus, effects similar to those of the present embodiment can be easily exerted by installing a program configured to execute the procedure of the display timing calculation process, in a normal computer through a computer readable storage medium, and then executing the program.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video processing apparatus comprising:
   a decoder configured to decode encoded moving image data comprising processing units, each processing unit comprising pictures corresponding to a predetermined reproduction time period;
   a detection module configured to detect a number of pictures in a processing unit in the moving image data by counting the pictures in the processing unit and a ratio of progressive frame pictures to interlaced field pictures in the processing unit, when the processing unit is decoded by the decoder;
   a frame rate calculation module configured to calculate a reproduction frame rate based on a first number of pictures, a first ratio of progressive frame pictures to interlaced field pictures, and the predetermined reproduction time period when timing information is not included in a reproduction target processing unit, the first number of pictures and the first ratio of progressive frame pictures to interlaced field pictures detected by the detection module when a reproduced processing unit preceding the reproduction target processing unit is decoded, the timing information indicative of display timings of the pictures in the reproduction target processing unit; and
   a display timing determining module configured to determine the display timings of the pictures in the reproduction target processing unit based on the reproduction frame rate.

2. The video processing apparatus of claim 1, wherein the display timing determining module is configured to determine the display timings of the pictures in the reproduction target processing unit based on the timing information, when the reproduction target processing unit comprises the timing information.

3. The video processing apparatus of claim 1, further comprising a storing module configured to store the first number of pictures and the first ratio of progressive frame pictures to interlaced field pictures to a memory,
wherein the frame rate calculation module is configured to calculate the reproduction frame rate based in part on the first number of pictures and the first ratio of progressive frame pictures to interlaced field pictures stored to the memory.

4. A video processing method comprising:
decoding encoded moving image data comprising processing units, each processing unit comprising pictures corresponding to a predetermined reproduction time period;
detecting a number of pictures in a processing unit in the moving image data by counting the pictures in the processing unit and a ratio of progressive frame pictures to interlaced field pictures in the processing unit when the processing unit is decoded;
calculating a reproduction frame rate based on a first number of pictures, a first ratio of progressive frame pictures to interlaced field pictures, and the predetermined reproduction time period when timing information is not included in a reproduction target processing unit, the first number of pictures and the first ratio of progressive frame pictures to interlaced field pictures detected by the detecting when a reproduced processing unit preceding the reproduction target processing unit is decoded, the timing information indicative of display timings of the pictures in the reproduction target processing unit; and
determining the display timings of the pictures in the reproduction target processing unit based on the reproduction frame rate.

5. The video processing method of claim 4, further comprising determining the display timings of the pictures in the reproduction target processing unit based on the timing information, when the reproduction target processing unit comprises the timing information.

6. The video processing method of claim 4, further comprising:
storing the first number of pictures and the first ratio of progressive frame pictures to interlaced field pictures to a memory; and
calculating the reproduction frame rate based in part on the first number of pictures and the first ratio of progressive frame pictures to interlaced field pictures stored to the memory.

* * * * *